(12) United States Patent
Misaki et al.

(10) Patent No.: US 11,386,438 B2
(45) Date of Patent: Jul. 12, 2022

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Masahiro Misaki, Nagoya (JP); Orie Mitsuhashi, Kasugai (JP); Masahiro Ueda, Nisshin (JP); Yoshitaka Atsumi, Toyota (JP); Naoto Sasagawa, Nishio (JP); Naoki Yamamuro, Nagoya (JP); Chiho Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/576,366

(22) Filed: Sep. 19, 2019

(65) Prior Publication Data

US 2020/0090190 A1 Mar. 19, 2020

(30) Foreign Application Priority Data

Sep. 19, 2018 (JP) .............................. JP2018-174937

(51) Int. Cl.
*G06Q 30/02* (2012.01)
(52) U.S. Cl.
CPC ..... *G06Q 30/0201* (2013.01); *G06Q 30/0242* (2013.01); *G06Q 30/0265* (2013.01); *G06Q 30/0282* (2013.01)

(58) Field of Classification Search
CPC ........... G06Q 30/0201; G06Q 30/0242; G06Q 30/0265; G06Q 30/0282; G06Q 30/0266; G06Q 30/0281
See application file for complete search history.

(56) References Cited

U.S. PATENT DOCUMENTS

2013/0124321 A1\* 5/2013 Yamane ............. G06Q 30/0261
705/14.57
2014/0309927 A1\* 10/2014 Ricci ....................... H04W 4/60
701/424

(Continued)

FOREIGN PATENT DOCUMENTS

JP 2005-222271 A 8/2005
JP 2012-098944 A 5/2012

(Continued)

*Primary Examiner* — Alexandru Cirnu
(74) *Attorney, Agent, or Firm* — Oliff PLC

(57) ABSTRACT

An information processing apparatus according to the present disclosure comprises a controller including at least one processor. The controller is configured to: acquire a level of crowdedness of an intended store, the intended store being a store as a destination of a vehicle in which a user is riding; if the level of crowdedness of the intended store is greater than a given threshold, extract a store with a lower level of crowdedness than the intended store as a given recommended store from among other stores belonging to a same business group as the intended store; generate a suggestion advertisement, the suggestion advertisement being an advertisement for suggesting changing the destination of the vehicle from the intended store to the given recommended store; and present the suggestion advertisement to the user riding in the vehicle via a mobile terminal, the mobile terminal being a terminal that moves with the vehicle.

11 Claims, 5 Drawing Sheets

(56) References Cited

U.S. PATENT DOCUMENTS

| | | | |
|---|---|---|---|
| 2015/0178817 A1* | 6/2015 | Fein | G06Q 30/0635 |
| | | | 705/26.81 |
| 2015/0219464 A1* | 8/2015 | Beaurepaire | G01C 21/3617 |
| | | | 701/538 |
| 2016/0003634 A1* | 1/2016 | Curtis | H04W 4/029 |
| | | | 701/410 |
| 2018/0251128 A1* | 9/2018 | Penilla | G08G 1/096741 |
| 2019/0005544 A1* | 1/2019 | Hong | G06Q 50/30 |
| 2019/0257665 A1* | 8/2019 | Friedman | G06Q 10/1093 |

FOREIGN PATENT DOCUMENTS

| | | |
|---|---|---|
| JP | 2012-215921 A | 11/2012 |
| JP | 2014-206857 A | 10/2014 |
| JP | 2016-126654 A | 7/2016 |

\* cited by examiner

[Fig. 1]
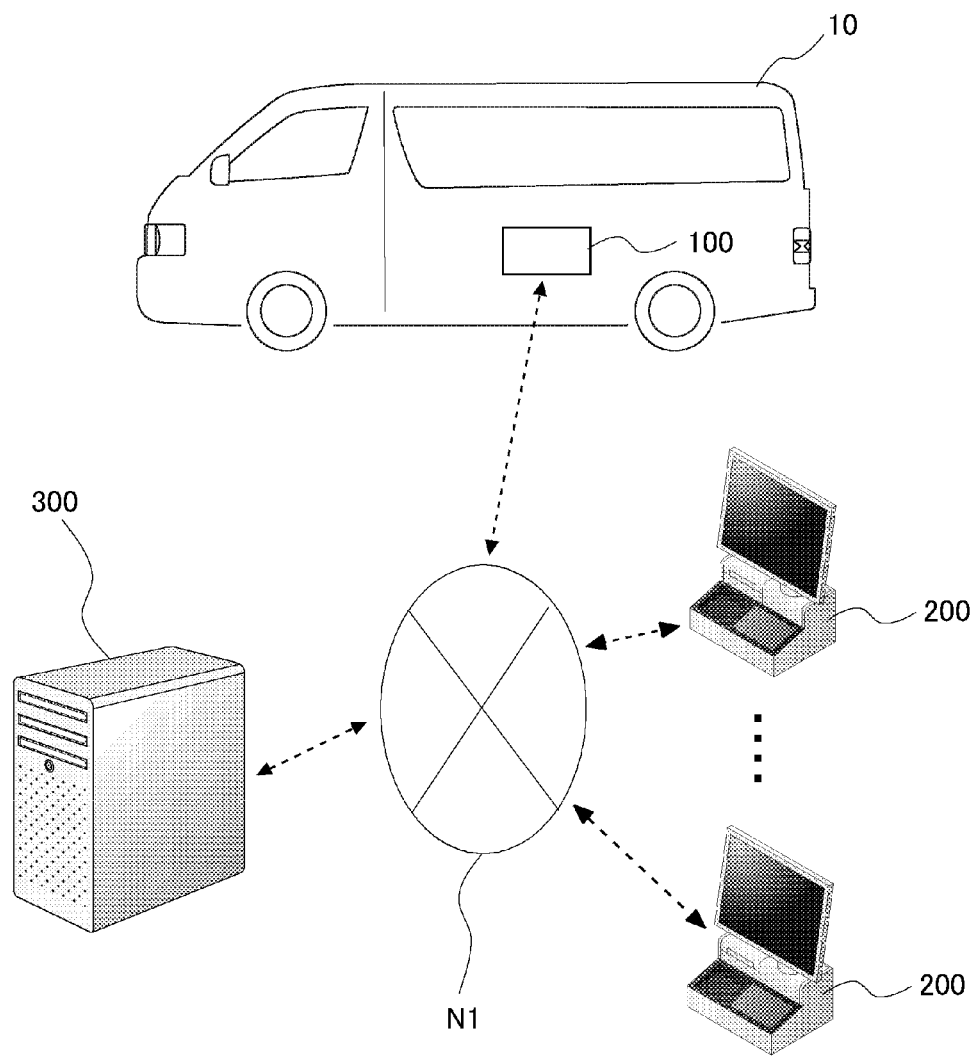

[Fig. 2]
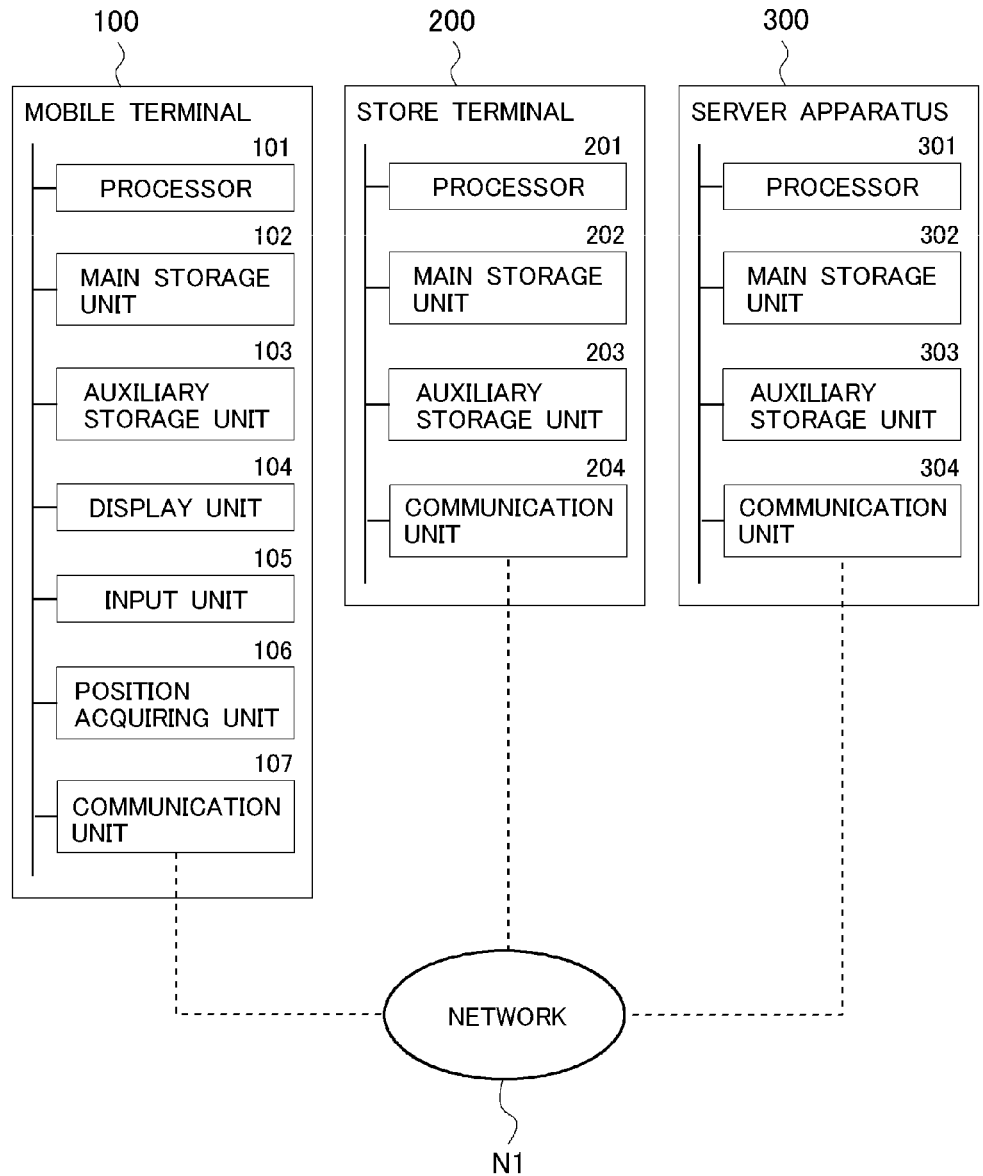

[Fig. 3]
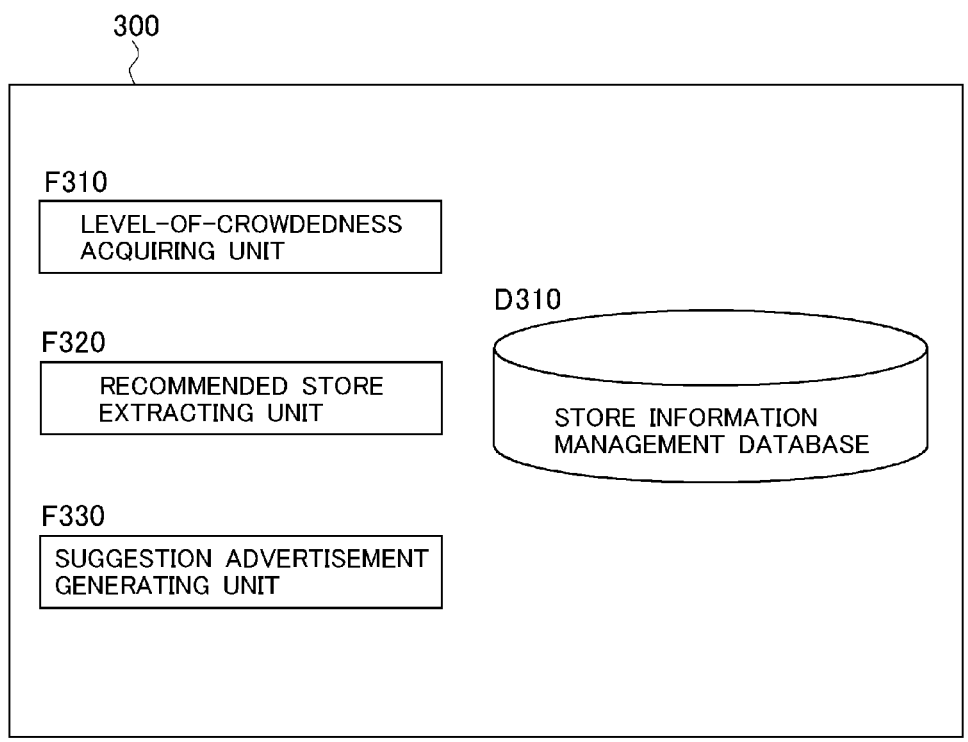
[Fig. 4]
STORE INFORMATION TABLE
| ADVERTISER ID | STORE NAME | STORE LOCATION | IN-STORE | WAITING |
|---|---|---|---|---|
| C001 | ○○1ST STORE | ... | FULL | 3 |
| | ○○2ND STORE | ... | VACANT | 0 |
| | ○○3RD STORE | ... | FULL | 1 |
| | ○○4TH STORE | ... | FULL | 0 |

[Fig. 5]
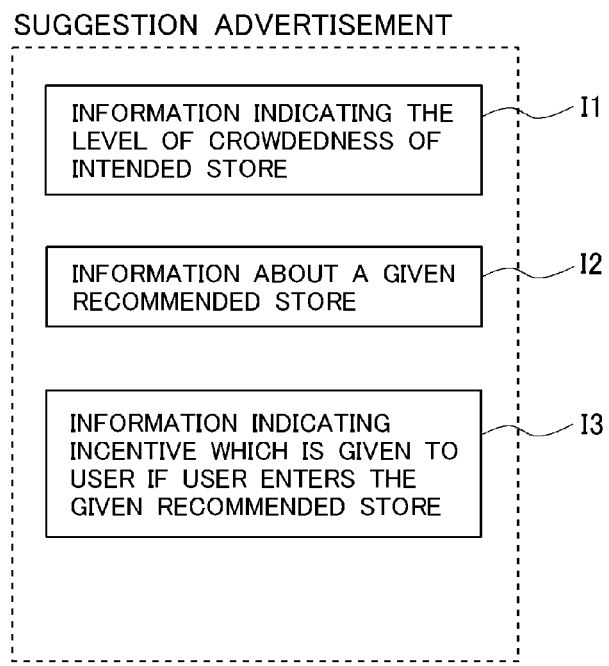

[Fig. 6]
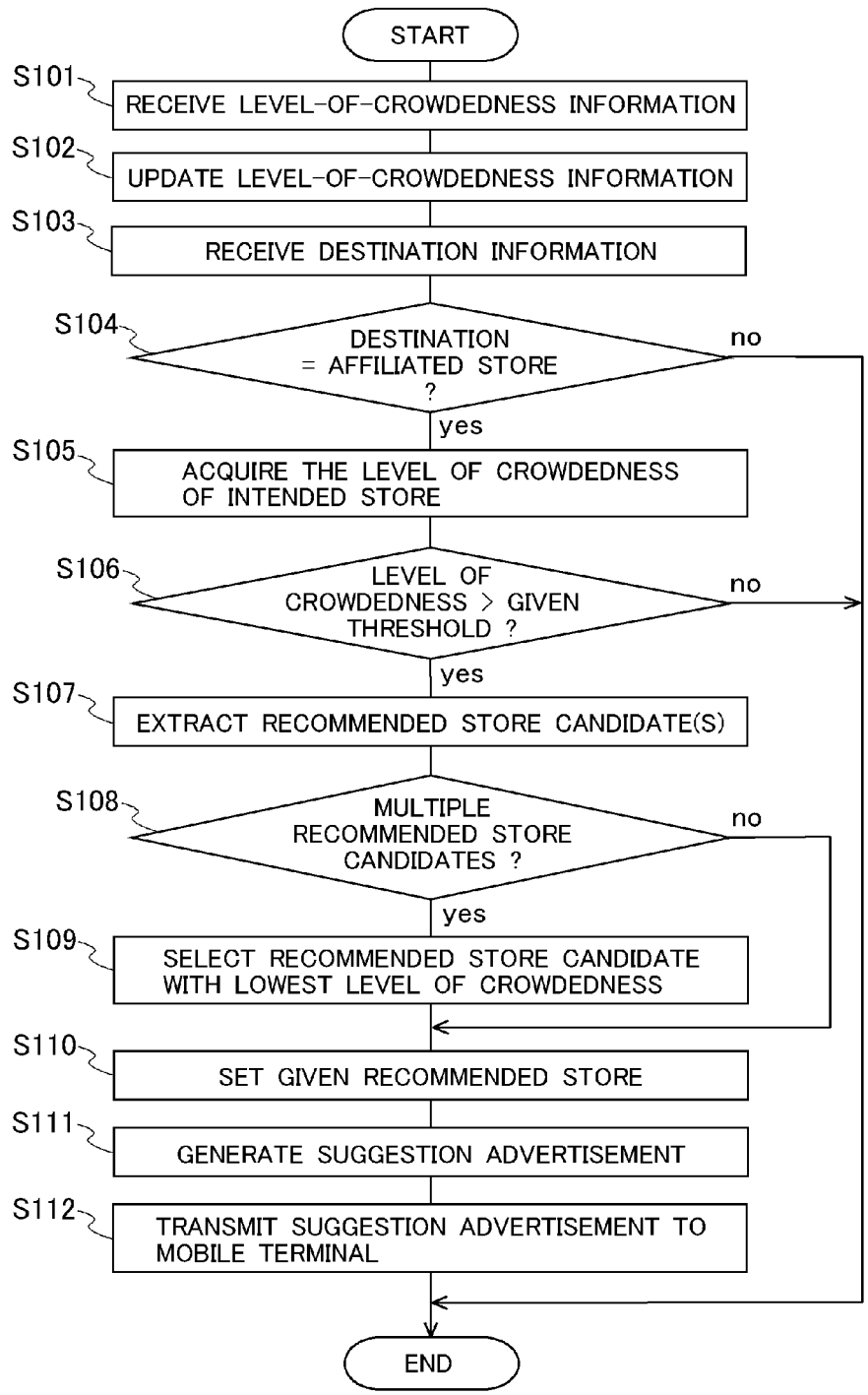

INFORMATION PROCESSING APPARATUS, INFORMATION PROCESSING METHOD, AND NON-TRANSITORY STORAGE MEDIUM

CROSS-REFERENCE TO RELATED APPLICATIONS

This application claims the benefit of Japanese Patent Application No. 2018-174937, filed on Sep. 19, 2018, which is hereby incorporated by reference herein in its entirety.

BACKGROUND

Technical Field

The present disclosure relates to an information processing apparatus, an information processing method, and a non-transitory storage medium.

Description of the Related Art

One known technique for a customer service is to determine the specifics of bonus for a customer based on information representing crowdedness conditions in a store, a remaining time before the closing of the store, the quantity of merchandise stock, the distance between the customer and the store etc., and to provide bonus information indicating the determined specifics of bonus to a terminal being used by the customer (see Patent Literature 1, for instance). Another known technique is to calculate the level of crowdedness of individual stores in a commercial establishment and to provide coupons for stores of a lower level of crowdedness to a customer (see Patent Literature 2, for instance).

CITATION LIST

Patent Literature

Patent Literature 1: Japanese Patent Application Laid-Open No. 2016-126654
Patent Literature 2: Japanese Patent Application Laid-Open No. 2014-206857

SUMMARY

An object of the present disclosure is to provide a technique capable of providing a customer with an advertisement beneficial to an advertiser in a case where an entity that owns multiple stores serves as the advertiser.

An information processing apparatus according to the present disclosure comprises a controller including at least one processor. The controller may be configured to:

acquire a level of crowdedness of an intended store, the intended store being a store as a destination of a vehicle in which a user is riding;

extract, if the level of crowdedness of the intended store is greater than a given threshold, a store with a lower level of crowdedness than the intended store as a given recommended store from among other stores belonging to a same business group as the intended store;

generate a suggestion advertisement, the suggestion advertisement being an advertisement for suggesting changing the destination of the vehicle from the intended store to the given recommended store; and present the suggestion advertisement to the user riding in the vehicle via a mobile terminal, the mobile terminal being a terminal that moves with the vehicle.

The present disclosure can also be regarded as an information processing method. In that case, the information processing method may be adapted to cause a computer to execute the steps of:

acquiring a level of crowdedness of an intended store, the intended store being a store as a destination of a vehicle in which a user is riding;

extracting, if the level of crowdedness of the intended store is greater than a given threshold, a store with a lower level of crowdedness than the intended store as a given recommended store from among other stores belonging to a same business group as the intended store;

generating a suggestion advertisement, the suggestion advertisement being an advertisement for suggesting changing the destination of the vehicle from the intended store to the given recommended store; and presenting the suggestion advertisement to the user riding in the vehicle via a mobile terminal, the mobile terminal being a terminal that moves with the vehicle.

The present disclosure can also be regarded as an information processing program or a non-transitory storage medium storing the information processing program. In that case, the information processing program may be adapted to cause a computer to execute the steps of:

acquiring a level of crowdedness of an intended store, the intended store being a store as a destination of a vehicle in which a user is riding;

extracting, if the level of crowdedness of the intended store is greater than a given threshold, a store with a lower level of crowdedness than the intended store as a given recommended store from among other stores belonging to a same business group as the intended store;

generating a suggestion advertisement, the suggestion advertisement being an advertisement for suggesting changing the destination of the vehicle from the intended store to the given recommended store; and presenting the suggestion advertisement to the user riding in the vehicle via a mobile terminal, the mobile terminal being a terminal that moves with the vehicle.

In accordance with the present disclosure, an advertisement beneficial to an advertiser can be provided to a customer in a case where an entity that owns multiple stores serves as the advertiser.

BRIEF DESCRIPTION OF DRAWINGS

FIG. 1 is a schematic diagram illustrating a configuration of an advertisement delivery system according to an embodiment;

FIG. 2 is a diagram illustrating the hardware configurations of a mobile terminal, a store terminal, and a server apparatus;

FIG. 3 is a block diagram illustrating a functional configuration of the server apparatus;

FIG. 4 is a diagram illustrating an exemplary configuration of a store information table stored in a store information management database;

FIG. 5 is a diagram illustrating an example of a suggestion advertisement in the embodiment; and FIG. 6 is a flowchart of a process performed by the server apparatus.

DESCRIPTION OF EMBODIMENTS

The present disclosure is an information processing apparatus for delivering an advertisement to a user of a vehicle (customer) whose destination is one of the stores that are included in a business group managed and operated by an advertiser.

If the store as the destination (intended store) is crowded to an extent that prevents the user from entering the store immediately when the vehicle in which the user is riding arrives at the intended store, the user might give up entering the intended store and enter another store. In such a situation, if the other store is of a different business group than the intended store, profit for the entity (individual or corporate) that manages and operates the business group to which the intended store belongs would be lost. The term "business group" as called herein refers to a group of stores run by the same capital, such as a regular chain, or a group of stores (franchisees) under affiliation contract with a franchiser, such as a franchise chain.

In such a context, a controller of the information processing apparatus according to the present disclosure acquires the level of crowdedness of the store as the destination of the vehicle in which the user is riding (the intended store). If the acquired level of crowdedness is greater than a given threshold, the controller extracts a store with a lower level of crowdedness than the intended store as a given recommended store from among other stores that belong to the same business group as the intended store. The controller next generates a suggestion advertisement, which is an advertisement for suggesting changing the destination of the vehicle from the intended store to the given recommended store. Then, the controller presents the suggestion advertisement to the user riding in the vehicle via a mobile terminal, which is a terminal that moves with the vehicle.

The information processing apparatus according to the present disclosure can make the user in the vehicle aware that the intended store is crowded and that there is a less crowded store than the intended store (a given recommended store) among stores belonging to the same business group as the intended store, thus appealing to the user in the vehicle to change the destination of the vehicle from the intended store to the given recommended store. Then, if the destination of the vehicle is changed from the intended store to the given recommended store, it can inhibit the user in the vehicle from giving up entering the intended store and entering a store of a different business group than the intended store. Consequently, it is possible to inhibit a possible loss in profit of the advertiser that manages and operates the business group to which the intended store belongs and to improve the user's convenience. Thus, an advertisement beneficial to an advertiser can be provided to the user (customer) in a case where an entity that owns multiple stores including the intended store serves as the advertiser.

If there are multiple stores with a lower level of crowdedness than the intended store among other stores belonging to the same business group as the intended store, the controller may extract the store with the lowest level of crowdedness among the multiple stores as the given recommended store. This can keep the user's waiting time before entering a store short as much as possible in a case where the destination of the vehicle is changed from the intended store to the given recommended store.

Likewise, if there are multiple stores with a lower level of crowdedness than the intended store among other stores belonging to the same business group as the intended store, the controller may extract the store at the shortest distance from the intended store or the store at the shortest distance from the current position of the vehicle among the multiple stores as the given recommended store. This can keep a change in the distance to be traveled by the vehicle to the minimum in a case where the destination of the vehicle is changed from the intended store to the given recommended store.

The suggestion advertisement may contain information about an incentive which is offered to the user if the user riding in the vehicle enters the given recommended store. The term "incentive" as called herein refers to electronic data such as points, discount vouchers, or gift certificates that can be used at the given recommended store, for example. By providing a suggestion advertisement containing information about such an incentive to the user, the user can be motivated to change the destination of the vehicle from the intended store to the given recommended store.

Embodiment 1

This embodiment describes an example where the present disclosure is applied in an advertisement delivery system in which an entity (individual or corporate) that manages and operates a business group including the intended store (e.g., a group of stores run by the same capital as the intended store, or a group of stores under affiliation contract with the same franchiser as the intended store) serves as an advertiser. The vehicle in which the user is riding in this embodiment is a vehicle that can change its destination on demand from the user, such as a manually or automatically operated automobile.

(System Configuration)

FIG. 1 is a diagram illustrating an exemplary configuration of an advertisement delivery system in this embodiment. In the example illustrated in FIG. 1, the advertisement delivery system includes a vehicle 10 in which a user is riding, a mobile terminal 100 that moves with the vehicle 10, store terminals 200 installed at stores belonging to a business group managed and operated by an advertiser, and a server apparatus 300 installed at a company that provides advertisement delivery services or the like. Although the example illustrated in FIG. 1 depicts a single vehicle 10 as the vehicle in which the user is riding, it is assumed that multiple vehicles including the vehicle 10 are included in the advertisement delivery system. It is also assumed that store terminals 200 are included in the advertisement delivery system as many as the stores belonging to the business group managed and operated by the advertiser. The mobile terminal 100 and the server apparatus 300 can connect to each other over a network N1. For the network N1, a WAN (Wide Area Network), which is a global-scale, public communication network like the Internet, or other kind of communication network may be employed, for example. The network N1 may also include a telephone communication network for mobile phones or a wireless communication network such as Wi-Fi (a registered trademark). The store terminal 200 and the server apparatus 300 also can connect to each other over the network N1.

The mobile terminal 100 is a terminal that moves with the vehicle 10, such as a car navigation system mounted on the vehicle 10 or a portable terminal and the like carried by the user riding in the vehicle 10. Such a mobile terminal 100 transmits information about a set destination to the server apparatus 300 when the destination of the vehicle 10 is set. For example, if the mobile terminal 100 is a car navigation system, it transmits information about a set destination to the server apparatus 300 when the user sets the destination on the car navigation system. If the mobile terminal 100 is a portable terminal carried by the user, it transmits information about a set destination to the server apparatus 300 when the user sets the destination on a car navigation application installed in the portable terminal. The mobile terminal 100 also has a function of presenting the advertisement information provided by the server apparatus 300 to the user riding in the vehicle 10 via a display device of the mobile terminal 100 and the like.

The store terminal 200 is a terminal that manages the level of crowdedness of the store in which the store terminal 200 is placed, and transmits information indicating the level of crowdedness of the store to the server apparatus 300. The information indicating the level of crowdedness of the store is transmitted from the store terminal 200 to the server apparatus 300 as appropriate. Information indicating the level of crowdedness of the store may also be transmitted from the store terminal 200 to the server apparatus 300 when a request from the server apparatus 300 arises.

The server apparatus 300 acquires, when the destination received from the mobile terminal 100 is a store belonging to the business group owned by the advertiser, the level of crowdedness of that store (the intended store). If the acquired level of crowdedness is greater than a given threshold, the server apparatus 300 extracts another store (a given recommended store) that belongs to the same business group as the intended store and that has a lower level of crowdedness than the intended store. Then, the server apparatus 300 generates an advertisement (suggestion advertisement) for suggesting changing the destination from the intended store to the given recommended store and transmits the generated suggestion advertisement to the mobile terminal 100. The server apparatus 300 having these functions corresponds to the "information processing apparatus" according to the present disclosure.

(Hardware Configuration)

FIG. 2 is a diagram exemplarily illustrating the respective hardware configurations of the mobile terminal 100, the store terminal 200, and the server apparatus 300.

The server apparatus 300 has a configuration of a typical computer. That is, the server apparatus 300 has a processor 301, a main storage unit 302, an auxiliary storage unit 303, and a communication unit 304. They are interconnected by a bus. The main storage unit 302 and the auxiliary storage unit 303 are storage media readable by a computer. The hardware configuration of the computer is not limited to the example illustrated in FIG. 2, but may be subjected to omission, replacement, or addition of components as appropriate.

The server apparatus 300 carries out a function suited for a given purpose by the loading and execution of a program stored in the storage medium into a work area of the main storage unit 302 by the processor 301 and the controlling of functional components or the like through the execution of the program.

The processor 301 is a CPU (Central Processing Unit) or a DSP (Digital Signal Processor), for example. The processor 301 controls the server apparatus 300 and performs computation for various kinds of information processing. The main storage unit 302 includes RAM (Random Access Memory) and ROM (Read Only Memory), for example. The auxiliary storage unit 303 is an EPROM (Erasable Programmable ROM) or a hard disk drive (HDD), for example. The auxiliary storage unit 303 may also include a removable medium, i.e., a removable storage medium. The removable medium is a USB (Universal Serial Bus) memory, or a disk storage medium such as CD (Compact Disc) and DVD (Digital Versatile Disc), for example.

The auxiliary storage unit 303 stores various programs, various data, and various tables in the storage medium in a readable and writable manner. In the auxiliary storage unit 303, an operating system (OS), various programs, various tables and the like are stored. Some or all of these pieces of information may also be stored in the main storage unit 302. Likewise, information stored in the main storage unit 302 may also be stored in the auxiliary storage unit 303.

The communication unit 304 performs transmission and reception of information between an external apparatus and the server apparatus 300. The communication unit 304 is a LAN (Local Area Network) interface board or a wireless communication circuit for wireless communication, for example. The LAN interface board or wireless communication circuit is connected to the network N1.

A series of processing executed in the server apparatus 300 arranged as described above may be executed by hardware, though it may be executed by software.

Next, the mobile terminal 100 is a small-sized computer that can be carried by the user, e.g., a smartphone, mobile phone, tablet terminal, personal information terminal, wearable computer (such as a smartwatch) and the like. The mobile terminal 100 may also be a car navigation system mounted on the vehicle 10 and connectable to the server apparatus 300 via the network N1, or a personal computer (PC) to be connected to the server apparatus 300 via the network N1.

The mobile terminal 100 has a processor 101, a main storage unit 102, an auxiliary storage unit 103, a display unit 104, an input unit 105, a position acquiring unit 106, and a communication unit 107, as illustrated in FIG. 2. Because the processor 101, the main storage unit 102 and the auxiliary storage unit 103 are similar to the processor 301, the main storage unit 302 and the auxiliary storage unit 303 of the server apparatus 300, they are not described again here. The display unit 104 is an LCD (Liquid Crystal Display), EL (Electroluminescence) panel, and the like, for example. The input unit 105 includes a touch panel or push buttons allowing the entry of symbols such as characters, a microphone allowing the entry of sound, and the like, for example. The position acquiring unit 106 is an instrument for acquiring the current position of the mobile terminal 100, and typically includes a GPS receiver and the like. The communication unit 107 is a communication circuit for accessing the network N1 by means of a mobile communication service (a telephone communication network for mobile phones etc., or wireless communication such as Wi-Fi) and performing data communication with the server apparatus 300 or the like, for example.

The store terminal 200 is a small-sized computer that can be carried by an employee of the store, e.g., a smartphone, mobile phone, tablet terminal, personal information terminal, wearable computer (such as a smartwatch) and the like. The store terminal 200 may also be a POS (Point Of Sale) terminal installed in the store and connected to the server apparatus 300 via the network N1, or a personal computer (PC) to be connected to the server apparatus 300 via the network N1.

The store terminal 200 has a processor 201, a main storage unit 202, an auxiliary storage unit 203, and a communication unit 204. Because the processor 201, the main storage unit 202, the auxiliary storage unit 203, and the communication unit 204 are similar to the processor 301, the main storage unit 302, the auxiliary storage unit 303 and the communication unit 304 of the server apparatus 300, they are not described again here.

(Functional Configuration of the Server Apparatus)

The functional configuration of the server apparatus 300 is now described with reference to FIG. 3. As illustrated in FIG. 3, the server apparatus 300 of this embodiment includes a level-of-crowdedness acquiring unit F310, a recommended store extracting unit F320, a suggestion advertisement generating unit F330, and a store information management database D310 as its functional components. The level-of-crowdedness acquiring unit F310, the recommended store extracting unit F320, and the suggestion advertisement generating unit F330 are formed via the execution of a computer program in the main storage unit 302 by the processor 301 of the server apparatus 300. Any one of the level-of-crowdedness acquiring unit F310, the recommended store extracting unit F320, and the suggestion advertisement generating unit F330 or part thereof may be formed of a hardware circuit.

The store information management database D310 is constructed via management of data stored in the auxiliary storage unit 303 by a program of a database management system (DBMS) executed by the processor 301 of the server apparatus 300. The store information management database D310 thus constructed is a relational database, for example.

Any one of the functional components of the server apparatus 300 or part of its processing may be executed by other computer connected to the network N1. For example, the processes included in the level-of-crowdedness acquiring unit F310, the processes included in the recommended store extracting unit F320, and the processes included in the suggestion advertisement generating unit F330 may be executed by separate computers.

The store information management database D310 has stored therein information on the individual stores belonging to business groups managed and operated by advertisers, where the identification information of an advertiser is associated with information on the individual stores belonging to the business group managed and operated by that advertiser. Here, an exemplary configuration of store information stored in the store information management database D310 is described with reference to FIG. 4. FIG. 4 is a diagram exemplarily illustrating the table configuration of store information. The pieces of information to be registered in the store information table are not limited to those of the example illustrated in FIG. 4, but can be subjected to addition, change, or deletion of fields as appropriate.

The store information table illustrated in FIG. 4 has fields for advertiser ID, store name, store location, in-store, and waiting. In the example illustrated in FIG. 4, four stores belong to the business group managed and operated by the advertiser, so information on the four stores (the store name field, the store location field, the in-store field, and the waiting field) is associated with one advertiser ID field. In the advertiser ID field, an advertiser ID for identifying each advertiser is registered. An advertiser ID is given when each advertiser makes membership registration for advertisement delivery services. In the store name field, information indicating the store name of each store belonging to the business group managed and operated by the advertiser (e.g., ○○ nth store) is registered. In the store location field, information indicating the location of each store (e.g., information indicating its address, information indicating its latitude and longitude or the like) is registered. In the in-store field, information indicating the crowdedness conditions in each store is registered. For example, "full" is registered when the store is full and "vacant" is registered when the store is not full (when there are empty seats in the store). In the waiting field, the number of user groups waiting for entry at each store (user groups waiting for seats) is registered. For example, "3" is registered when three user groups are waiting for entry and "0" is registered when there is no group waiting for entry.

The information registered in the in-store field and in the waiting field of the store information table is provided from the store terminal 200 of each store to the server apparatus 300 as mentioned above. In doing so, information indicating the crowdedness conditions in the store (information indicating whether the store is full or there are empty seats in the store) and/or the number of user groups waiting for entry may be input to the store terminal 200 by an employee of each store. Alternatively, images of the interior and exterior of the store captured with a camera may be analyzed by the processor 201 of the store terminal 200, thereby determining the crowdedness conditions in the store and/or the number of user groups waiting for entry.

The level-of-crowdedness acquiring unit F310 acquires, when a store belonging to the business group managed and operated by the advertiser is set as the destination of the vehicle 10, the level of crowdedness of that store as the destination (the intended store). In particular, when the server apparatus 300 receives information indicating the destination of the vehicle 10 transmitted from the mobile terminal 100 (hereinbelow also denoted as "destination information"), the level-of-crowdedness acquiring unit F310 first determines whether the destination of the vehicle 10 is a store that is included in the business group owned by the advertiser. Here, in a case where information indicating the name of the destination is transmitted from the mobile terminal 100 to the server apparatus 300 as the destination information, the level-of-crowdedness acquiring unit F310 accesses the store information management database D310 and searches for a store information table in which a store name matching the name of the destination is registered in the store name field. Then, if a store information table in which a store name matching the name of the destination is registered in the store name field is stored in the store information management database D310, the level-of-crowdedness acquiring unit F310 determines that the destination of the vehicle 10 is a store that is included in the business group owned by the advertiser. In a case where information indicating the location of the destination is transmitted from the mobile terminal 100 to the server apparatus 300 as the destination information, the level-of-crowdedness acquiring unit F310 may access the store information management database D310 and search for a store information table in which a store location matching the location of the destination is registered in the store location field. Then, if a store information table in which a store location matching the location of the destination is registered in the store location field is stored in the store information management database D310, the level-of-crowdedness acquiring unit F310 may determine that the destination of the vehicle 10 is a store that is included in the business group owned by the advertiser. When it is determined that the destination of the vehicle 10 is a store included in the business group owned by the advertiser in the above-described manner, the level-of-crowdedness acquiring unit F310 reads the information registered in the in-store field for the intended store and the information registered in the waiting field for the intended store, within the store information table in which a store name matching the name of the destination is registered in the store name field (or alternatively a store information table in which a store location matching the location of the destination is registered in the store location field). In this way, the level of crowdedness of the intended store is acquired.

The recommended store extracting unit F320 extracts, if the level of crowdedness acquired by the level-of-crowdedness acquiring unit F310 is greater than the given threshold, a store with a lower level of crowdedness than the intended store as the given recommended store from among other stores belonging to the same business group as the intended store. In particular, the recommended store extracting unit F320 first determines whether the level of crowdedness acquired by the level-of-crowdedness acquiring unit F310 is greater than the given threshold. The term "given threshold" as called herein corresponds to a level of crowdedness at which the time taken from when the vehicle 10 arrives at the intended store until when the user riding in the vehicle 10 is allowed to enter the intended store (i.e., a waiting time before entry) is expected to be relatively long (e.g., a level of crowdedness representing that the intended store is full and a predetermined number or more of user groups are waiting for entry). If the level of crowdedness of the intended store is equal to or greater than the given threshold, the recommended store extracting unit F320 accesses the store information table associated with the advertiser ID of the advertiser that manages and operates the business group to which the intended store belongs, and extracts a store with a lower level of crowdedness than the intended store as the given recommended store from among other stores registered in the store information table. If there are multiple stores with a lower level of crowdedness than the intended store, the store with the lowest level of crowdedness among the multiple stores may be extracted as the given recommended store, for example. Here, if "○○ 1st store" is the intended store in the example illustrated in FIG. 4 mentioned above, three stores, or "○○ 2nd store", "○○ 3rd store" and "○○ 4th store", apply as stores having a lower level of crowdedness than the intended store. Among "○○ 2nd store", "○○ 3rd store", and "○○ 4th store", the store with the lowest level of crowdedness is "○○ 2nd store". Thus, "○○ 2nd store" may be extracted as the given recommended store.

The suggestion advertisement generating unit F330 generates a suggestion advertisement for suggesting changing the destination of the vehicle 10 from the intended store to the given recommended store. The suggestion advertisement in this embodiment contains, as illustrated in FIG. 5, information indicating the level of crowdedness of the intended store (reference numeral: I1), information about the given recommended store (reference numeral: I2), and information indicating an incentive which is given to the user in the vehicle 10 if the user enters the given recommended store (reference numeral: I3), for example. The information indicating the level of crowdedness of the intended store is information indicating the crowdedness conditions in the intended store and/or the number of user groups waiting for entry; for which the information registered in the in-store field and the waiting field of the store information table corresponding to the intended store is utilized. The information about the given recommended store includes information indicating the store name of the given recommended store, its location, its level of crowdedness and the like. The information indicating the level of crowdedness of the given recommended store is information indicating the crowdedness conditions in the given recommended store and/or the number of user groups waiting for entry; for which the information registered in the in-store field and the waiting field of the store information table corresponding to the given recommended store is utilized. The information indicating an incentive is electronic data such as points, discount vouchers, or gift certificates that can be used at the given recommended store if the user in the vehicle 10 enters the given recommended store. The information indicating an incentive may be preset on a per-store basis and may be varied in accordance with, e.g., the distance from the intended store to the given recommended store (e.g., a greater incentive may be given to the user as the distance from the intended store to the given recommended store is longer). The suggestion advertisement generated by the suggestion advertisement generating unit F330 is transmitted from the communication unit 304 to the mobile terminal 100. When the suggestion advertisement thus transmitted from the server apparatus 300 is received by the communication unit 107 of the mobile terminal 100, the processor 101 displays the suggestion advertisement by means of the display unit 104, thereby presenting the suggestion advertisement to the user riding in the vehicle 10. This allows the user riding in the vehicle 10 to grasp the crowdedness conditions of the intended store as well as a given recommended store with a lower level of crowdedness than the intended store.

(Flow of Processing)

A flow of a process at the server apparatus 300 according to this embodiment is described with reference to FIG. 6. FIG. 6 is a flowchart of the process executed by the server apparatus 300.

In FIG. 6, the server apparatus 300 receives information indicating the level of crowdedness of each store (level-of-crowdedness information) (step S101). Specifically, first at each store terminal 200, an employee of the store enters level-of-crowdedness information to the input unit 205 (information indicating the crowdedness conditions in the store and the number of user groups waiting for entry). When the level-of-crowdedness information for each store is thus updated, the level-of-crowdedness information after the update is transmitted from the communication unit 207 of the store terminal 200 to the server apparatus 300. As a result, the server apparatus 300 receives information indicating the level of crowdedness of each store. To the level-of-crowdedness information transmitted from the store terminal 200 to the server apparatus 300, the advertiser ID of the advertiser that manages and operates the business group to which each store belongs and the store name of the store are added.

At step S102, the server apparatus 300 updates the information registered in the in-store field and the waiting field of the store information table within the store information management database D310 based on the level-of-crowdedness information received at step S101. Specifically, the server apparatus 300 accesses the store information table corresponding to the advertiser ID added in the level-of-crowdedness information among the store information tables stored in the store information management database D310. Next, among the stores registered in the store information table corresponding to the advertiser ID, the server apparatus 300 updates, with the received level-of-crowdedness information, the information registered in the in-store field and the waiting field for the store corresponding to the store name added in the level-of-crowdedness information.

At step S103, the server apparatus 300 receives information indicating the destination of the vehicle 10 (destination information). Specifically, the destination of the vehicle 10 is first set on the mobile terminal 100 by the user riding in the vehicle 10. After the destination of the vehicle 10 is thus set, information indicating the destination that has been set (information indicating the name of the destination or the location of the destination) is transmitted from the communication unit 107 of the mobile terminal 100 to the server apparatus 300. As a result, the server apparatus 300 receives the destination information.

At step S104, the server apparatus 300 determines whether the destination of the vehicle 10 is a store that belongs to the business group managed and operated by the advertiser (an affiliated store) based on the destination information received at step S103. Specifically, as mentioned above, the level-of-crowdedness acquiring unit F310 accesses the store information management database D310 and searches for a store information table in which a store name or a store location matching the destination information (the name of the destination or the location thereof) is registered in the store name field or in the store location field. If a store information table in which a store name or a store location matching the destination information is registered in the store name field or in the store location field is not stored in the store information management database D310, step S104 results in a negative determination. If step S104 results in a negative determination, the server apparatus 300 ends the processing. In contrast, if a store information table in which a store name or a store location matching the destination information is registered in the store name field or in the store location field is stored in the store information management database D310, step S104 results in an affirmative determination. If step S104 results in an affirmative determination, the server apparatus 300 proceeds to step S105.

At step S105, the server apparatus 300 acquires the level of crowdedness of the store that is being set as the destination of the vehicle 10 (the intended store). Specifically, the level-of-crowdedness acquiring unit F310 of the server apparatus 300 accesses the store information table in which the intended store is registered, and reads the information registered in the in-store field and in the waiting field for the intended store, thereby acquiring the level of crowdedness of the intended store.

At step S106, the recommended store extracting unit F320 of the server apparatus 300 determines whether the level of crowdedness acquired at step S105 is greater than the given threshold. If there are empty seats in the intended store or if the intended store is full but the number of user groups waiting for entry is less than a given number, for example, step S106 results in a negative determination. If step S106 results in a negative determination, the server apparatus 300 ends the processing. In contrast, if the intended store is full and the number of user groups waiting for entry is equal to or greater than the given number, step S106 results in an affirmative determination. If step S106 results in an affirmative determination, the server apparatus 300 proceeds to step S107.

At step S107, the recommended store extracting unit F320 of the server apparatus 300 accesses the store information table associated with the advertiser ID of the advertiser that manages and operates the business group to which the intended store belongs, and extracts a store(s) (recommended store candidate(s)) with a lower level of crowdedness than the intended store from among other stores belonging to the same business group as the intended store. Here, from the viewpoint of enhancing the appeal of a suggestion advertisement more reliably, stores that are located excessively far from the intended store may be excluded from extraction as recommended store candidates among other stores belonging to the same business group as the intended store. That is, among other stores belonging to the same business group as the intended store, stores that are located within a range of a given distance from the intended store and that have a lower level of crowdedness than the intended store may be extracted as recommended store candidates.

At step S108, the recommended store extracting unit F320 of the server apparatus 300 determines whether multiple recommended store candidates were extracted at step S107. If step S108 results in an affirmative determination, the recommended store extracting unit F320 selects the recommended store candidate with the lowest level of crowdedness among the multiple recommended store candidates (step S109). Then, the recommended store extracting unit F320 sets the recommended store candidate selected at step S109 as the given recommended store (step S110). If step S108 results in a negative determination, the recommended store extracting unit F320 skips step S109 to proceed to step S110, where it sets the recommended store candidate extracted at step S107 as the given recommended store.

At step S111, the server apparatus 300 generates a suggestion advertisement. Specifically, the suggestion advertisement generating unit F330 of the server apparatus 300 generates a suggestion advertisement that contains information indicating the level of crowdedness of the intended store, information about the given recommended store that was set at step S110 (information indicating the store name of the given recommended store, its location, and its level of crowdedness), and information indicating an incentive which is offered to the user if the user enters the given recommended store (see FIG. 5, described earlier). Here, in addition to these pieces of information, the suggestion advertisement may contain the time at which the vehicle 10 is predicted to arrive at the given recommended store (a scheduled arrival time). In that case, the suggestion advertisement generating unit F330 may compute the scheduled arrival time based on the distance from the current position of the vehicle 10 to the given recommended store and/or information on congestion on a route from the current position of the vehicle 10 to the given recommended store. The information to be contained in the suggestion advertisement is not limited to the aforementioned pieces of information; it may contain at least information needed for making the user aware that the waiting time before entering the given recommended store is shorter than that for the intended store and information needed for changing the destination of the vehicle 10 from the intended store to the given recommended store.

At step S112, the server apparatus 300 transmits the suggestion advertisement generated at step S111 to the mobile terminal 100. Here, a signal for requesting the display of the suggestion advertisement on the display unit 104 of the mobile terminal 100 may be added to the suggestion advertisement. Then, when the suggestion advertisement transmitted from the server apparatus 300 is received by the communication unit 107 of the mobile terminal 100, the processor 101 of the mobile terminal 100 displays the suggestion advertisement on the display unit 104, thereby presenting the suggestion advertisement to the user.

With the flow described above, when a store that belongs to the business group managed and operated by the advertiser and has a level of crowdedness higher than the given threshold is set as the intended store, the user can be made aware that the intended store is crowded and that there is a store (given recommended store) that is less crowded than the intended store among stores belonging to the same business group as the intended store. This can appeal to the user to change the destination of the vehicle 10 from the intended store to the given recommended store. Then, if the destination of the vehicle 10 is changed from the intended store to the given recommended store with the appealing effect of the suggestion advertisement, it can inhibit the user in the vehicle 10 from giving up entering the intended store and entering a store of a different business group than the intended store. Consequently, it is possible to inhibit a loss in profit of the advertiser that manages and operates the business group to which the intended store belongs and to improve the user's convenience. Furthermore, the level of crowdedness can be smoothed among stores belonging to the business group managed and operated by the advertiser.

Moreover, since the suggestion advertisement in this embodiment contains information about an incentive which is offered to the user if the user enters the given recommended store, it can motivate the user to change the destination of the vehicle 10 from the intended store to the given recommended store. This can enhance the appeal of the suggestion advertisement, thus further facilitating inhibiting the user from giving up entering the intended store and entering a store of a different business group than the intended store.

Additionally, this embodiment presents a suggestion advertisement to the user before the vehicle 10 arrives at the intended store (at the time when the intended store is set as the destination of the vehicle 10). This allows the user to change the destination of the vehicle 10 from the intended store to the given recommended store before the vehicle 10 arrives at the intended store. As a result, a sense of futility to be perceived by the user can be lessened compared to the case of changing the destination after the vehicle 10 arrives at the intended store.

<Modification>

The embodiment described above is merely an example and the present disclosure may be practiced with appropriate modifications without departing from the scope thereof.

For example, in the embodiment 1, if there are multiple stores (recommended store candidates) with a lower level of crowdedness than the intended store, the recommended store candidate with the lowest level of crowdedness among the multiple recommended store candidates is set as the given recommended store. However, the recommended store candidate at the shortest distance from the intended store among the recommended store candidates may be set as the given recommended store. When the given recommended store is set in such a manner, a change in the distance to be traveled by the vehicle due to change of the destination of the vehicle from the intended store to the given recommended store can be kept to the minimum. As a result, the user is less likely to be reluctant about changing the destination of the vehicle from the intended store to the given recommended store. Alternatively, if there are multiple stores (recommended store candidates) with a lower level of crowdedness than the intended store, the recommended store candidate at the shortest distance from the current position of the vehicle among the multiple recommended store candidates may be extracted as the given recommended store. When the given recommended store is set in such a manner, the distance to be traveled from the current position of the vehicle to the given recommended store can be kept to the minimum in a case where the destination of the vehicle is changed from the intended store to the given recommended store.

The embodiment 1 described an example where a suggestion advertisement contains information indicating the level of crowdedness of the intended store, information about the given recommended store set at step S110, and information indicating an incentive which is given to the user if the user enters the given recommended store. However, in addition to the three pieces of information, the suggestion advertisement may contain the time at which the vehicle is predicted to arrive at the given recommended store (an expected arrival time). In that case, the suggestion advertisement generating unit may compute the expected arrival time based on the distance from the current position of the vehicle to the given recommended store and/or information on congestion on a route to be traveled from the current position of the vehicle to the given recommended store. Presentation of such a suggestion advertisement to the user helps the user to make a plan when he/she considers changing the destination of the vehicle from the intended store to the given recommended store. Optionally, if an operation for changing the destination from the intended store to the given recommended store is performed by the user on the mobile terminal, a request for reserving seats in the store may be transmitted from the server apparatus to the given recommended store, along with the user's scheduled arrival time. This can improve the user's convenience in a case where the destination of the vehicle is changed from the intended store to the given recommended store. Also, inclusion of information about such a service in the suggestion advertisement could further enhance the appeal of the suggestion advertisement.

In the embodiment 1, the server apparatus acquires the level of crowdedness of each affiliated store by directly communicating with the store terminal at the store. However, a management server apparatus may be placed at a company that manages and operates the affiliated stores and the like, such that the management server apparatus collects the level of crowdedness of the affiliated stores and the collected level of crowdedness is provided to the server apparatus from the management server apparatus.

<Others>

The embodiment described above is merely an example and the present disclosure may be practiced with appropriate modifications without departing from the scope thereof.

Also, the processes and functional units described in the present disclosure may be practiced in combination as desired unless technical inconsistency arises. Further, a process that is described as being performed by a single apparatus may be executed by multiple apparatuses in a shared manner. Or a process that is described as being performed by different apparatuses may be executed by a single apparatus. A hardware configuration with which each function is carried out in a computer system may be modified flexibly.

The present disclosure may also be carried out by supplying a computer with a computer program (information processing program) that implements the functions described in the above embodiment and variations and reading and executing the program by one or more processors of the computer. Such a computer program may be provided to the computer through a non-transitory, computer-readable storage medium (non-transitory storage medium) connectable to a system bus of the computer or may be provided to the computer via a network. The non-transitory, computer-readable storage medium is a storage medium that stores information such as data and programs by electric, magnetic, optical, mechanical, or chemical action and is readable by a computer and the like, e.g., any type of disk such as magnetic disk (floppy (a registered trademark) disk, hard disk drive (HDD), etc.), optical disk (CD-ROM, DVD disk, Blu-ray disk, etc.), or read-only memory (ROM), random access memory (RAM), EPROM, EEPROM, magnetic card, flash memory, optical card, SSD (Solid State Drive) etc.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. An information processing apparatus comprising a controller that includes at least one processor, the controller being configured to:
   acquire a level of crowdedness of an intended store from a terminal device located in the intended store, the intended store being a store as a destination of an automatically operated vehicle in which a user is riding;
   in response to the acquired level of crowdedness of the intended store being greater than a given threshold, and prior to the automatically operated vehicle arriving at the destination of the store, acquire a level of crowdedness of a plurality of other stores belonging to a same business group, and extract a store with a lower level of crowdedness than the intended store as a given recommended store from among the plurality of other stores belonging to the same business group as the intended store;
   generate a notification indicating the given recommended store and a location of the given recommended store, the notification including a suggestion advertisement suggesting changing the destination of the automatically operated vehicle from the intended store to the given recommended store;
   transmit instructions including the generated notification to display the suggestion advertisement on a display of a mobile terminal of the user riding in the automatically operated vehicle prior to the automatically operated vehicle arriving at the destination of the store, the mobile terminal being a terminal located in the automatically operated vehicle; and
   in response to receiving acceptance of the given recommended store in the notification, generate and transmit, to the mobile terminal, instructions including information for changing the destination of the automatically operated vehicle from the intended store to the given recommended store, whereby the destination of the automatically operated vehicle is changed from the intended store to the location of the given recommended store.

2. The information processing apparatus according to claim 1, wherein when a plurality of eligible stores of the plurality of other stores have a lower level of crowdedness than the intended store belonging to the same business group as the intended store, the controller extracts a store of the plurality of eligible stores with a lowest level of crowdedness among the plurality of stores as the given recommended store.

3. The information processing apparatus according to claim 1, wherein when a plurality of eligible stores of the plurality of other stores have a lower level of crowdedness than the intended store among the plurality of other stores belonging to the same business group as the intended store, the controller extracts a store at a shortest distance from the intended store among the plurality of eligible stores as the given recommended store.

4. The information processing apparatus according to claim 1, wherein the suggestion advertisement contains information about an incentive that is offered to the user when the user riding in the vehicle enters the given recommended store.

5. The information processing apparatus according to claim 2, wherein the suggestion advertisement contains information about an incentive that is offered to the user when the user riding in the vehicle enters the given recommended store.

6. The information processing apparatus according to claim 3, wherein the suggestion advertisement contains information about an incentive that is offered to the user when the user riding in the vehicle enters the given recommended store.

7. The information processing apparatus according to claim 4, wherein the suggestion advertisement contains information indicating the level of crowdedness of the given recommended store.

8. The information processing apparatus according to claim 5, wherein the suggestion advertisement contains information indicating the level of crowdedness of the given recommended store.

9. The information processing apparatus according to claim 6, wherein the suggestion advertisement contains information indicating the level of crowdedness of the given recommended store.

10. An information processing method causing a computer to execute steps of:
    acquiring a level of crowdedness of an intended store from a terminal device located in the intended store, the intended store being a store as a destination of an automatically operated vehicle in which a user is riding;
    in response to the acquired level of crowdedness of the intended store being greater than a given threshold, and prior to the automatically operated vehicle arriving at the destination of the store, acquiring a level of crowdedness of a plurality of other stores belonging to a same business group, and extracting a store with a lower level of crowdedness than the intended store as a given recommended store from among the plurality of other stores belonging to a same business group as the intended store;
    generating a notification indicating the given recommended store and a location of the given recommended store, the notification including a suggestion advertisement suggesting changing the destination of the automatically operated vehicle from the intended store to the given recommended store;
    transmitting instructions including the generated notification to display the suggestion advertisement on a display of a mobile terminal of the user riding in the automatically operated vehicle prior to the automatically operated vehicle arriving at the destination of the store, the mobile terminal being a terminal located in the automatically operated vehicle; and
    in response to receiving acceptance of the given recommended store in the notification, generating and transmitting, to the mobile terminal, instructions including information for changing the destination of the automatically operated vehicle from the intended store to the given recommended store, whereby the destination of the automatically operated vehicle is changed from the intended store to the location of the given recommended store.

11. A non-transitory computer readable storage medium storing an information processing program for causing a computer to execute steps of:

acquiring a level of crowdedness of an intended store from a terminal device located in the intended store, the intended store being a store as a destination of an automatically operated vehicle in which a user is riding;

in response to the acquired level of crowdedness of the intended store being greater than a given threshold, and prior to the automatically operated vehicle arriving at the destination of the store, acquiring a level of crowdedness of a plurality of other stores belonging to a same business group, and extracting a store with a lower level of crowdedness than the intended store as a given recommended store from among the plurality of other stores belonging to the same business group as the intended store;

generating a notification indicating the given recommended store and a location of the given recommended store, the notification including a suggestion advertisement suggesting changing the destination of the automatically operated vehicle from the intended store to the given recommended store;

transmitting instructions including the generated notification to display the suggestion advertisement on a display of a mobile terminal of the user riding in the automatically operated vehicle prior to the automatically operated vehicle arriving at the destination of the store, the mobile terminal being a terminal located in the automatically operated vehicle; and in response to receiving acceptance of the given recommended store in the notification, generating and transmitting, to the mobile terminal, instructions including information for changing the destination of the automatically operated vehicle from the intended store to the given recommended store, whereby the destination of the automatically operated vehicle is changed from the intended store to the location of the given recommended store.

* * * * *